(12) United States Patent
Hernacki et al.

(10) Patent No.: US 8,424,007 B1
(45) Date of Patent: Apr. 16, 2013

(54) PRIORITIZING TASKS FROM VIRTUAL MACHINES

(75) Inventors: Brian Hernacki, San Carlos, CA (US); Sourabh Satish, Fremont, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1053 days.

(21) Appl. No.: 12/242,685

(22) Filed: Sep. 30, 2008

(51) Int. Cl.
*G06F 9/46* (2006.01)

(52) U.S. Cl.
USPC .......................................... 718/103

(58) Field of Classification Search ........................ None
See application file for complete search history.

(56) References Cited

U.S. PATENT DOCUMENTS

| | | | | |
|---|---|---|---|---|
| 2005/0125793 | A1* | 6/2005 | Aguilar et al. | 718/100 |
| 2005/0149933 | A1* | 7/2005 | Saito et al. | 718/100 |
| 2005/0160423 | A1* | 7/2005 | Bantz et al. | 718/1 |
| 2008/0082772 | A1* | 4/2008 | Savagaonkar et al. | 711/163 |
| 2008/0250415 | A1* | 10/2008 | Illikkal et al. | 718/103 |

OTHER PUBLICATIONS

Jinesh Varia; Cloud Architectures; Jul. 18, 2008; Amazon Web Services; http://aws.typepad.com/aws/2008/07/white-paper-on.html.
Doug Kaye; Amazon for Infrastructure-on-Demand; Feb. 3, 2007; Blogarithms; http://www.blogarithms.com/index.php/archives/2007/02/03/amazon-for-infrastructure-on-demand/.
Jeff; Wanted: AWS Architecture Blog Posts & Diagrams; Jun. 27, 2008; Amazon Web Services Blog; http://aws.typepad.com/aws/2008/06/wanted-architec.html.
Don MacAskill; SkyNet Lives! (aka EC2 @ SmugMug); Jun. 3, 2008; SmugBlog: Don MacAskill; http://blogs.smugmug.com/don/2008/06/03/skynet-lives-aka-ec2-smugmug/.

* cited by examiner

*Primary Examiner* — Eddie P Chan
*Assistant Examiner* — John Lindlof
(74) *Attorney, Agent, or Firm* — ALG Intellectual Property, LLC

(57) ABSTRACT

A computer-implemented method for prioritizing virtual machine tasks may include receiving a request to perform a first task from a virtual machine. The request may include information relevant to determining a priority of the task. The method may include determining the priority of the task based on the information. The method may further include scheduling the first task based on the priority of the task. The method may include selecting the first task for execution based on the scheduling. The method may include notifying the virtual machine that the first task has been selected for execution. Various related methods, computer-readable media, and systems are also disclosed.

20 Claims, 8 Drawing Sheets

PRIORITIZING TASKS FROM VIRTUAL MACHINES

BACKGROUND

Consumers and businesses increasingly run computer software within virtual machines. Virtual machines may be managed by a virtualization platform referred to as a hypervisor. A hypervisor may manage multiple virtual machines on a single host computing system. When multiple virtual machines run on a single system under a hypervisor, they may attempt to access the same resource, such as a Central Processing Unit (CPU) or a storage device, at the same time. While operating systems of the virtual machines may have schedulers that attempt to balance loads on resources, the operating systems may not be aware of other virtual machines attempting to access the same resources. Unfortunately, traditional hypervisors do not effectively manage access to shared resources.

Traditional hypervisors may only provide limited resource-load management for virtual machines. For example, a hypervisor may limit use of a resource for each virtual machine it manages. This approach may result in inefficiencies when one virtual machine is not using its full portion of the resource and another virtual machine could perform better with access to more than its portion of the resource.

In another approach, a hypervisor may dynamically schedule and allocate resources among virtual machines. However, hypervisors that implement dynamic resource allocation only address resource utilization at a single point in time and may not be aware of present or future needs of their virtual machines. Also, these hypervisors do not allow operating systems of virtual machines to cooperate to manage load distribution over time. As a result, a high priority process from one virtual machine may be delayed when a lower priority process from another virtual machine is monopolizing a shared resource.

SUMMARY

The instant disclosure is directed to methods and systems for prioritizing tasks from virtual machines by facilitating communications between a hypervisor and one or more virtual machines. For example, an agent in a first virtual machine may identify a first task within the first virtual machine. The agent may then send a request to perform the first task to a scheduling module on a hypervisor. After receiving the request to perform the first task, the scheduling module may determine a priority of the first task. The scheduling module may use priority information sent with the request to determine the priority of the first task. Priority information may include an identifier of the task, a category of the task, a priority of the task, or any other information relevant to determining the priority of a task.

The scheduling module may schedule the first task based on the relative priority of the first task in relation to tasks requested by other virtual machines. When it is the first task's turn to execute, the scheduling module may select the first task for execution and notify the first virtual machine that the first task has been selected for execution. The first virtual machine may then execute the first task.

In some embodiments, the scheduling module may determine that a second, higher priority task may need to use a resource that the first task is using. As a result, the scheduling module may request that the first virtual machine suspend the first task. The first virtual machine may receive the suspension request and may decide whether or not to suspend the first task. If the first virtual machine decides to suspend the first task, the first virtual machine may send the scheduling module a notification that the first task has been (or will be) suspended.

After being notified that the first task has been suspended, the scheduling module may notify the second virtual machine that the second task may execute. The second virtual machine may then execute the second task, and after the second task is done executing, the scheduling module may notify the first virtual machine that it may resume the first task. The first virtual machine may execute the first task and may notify the hypervisor's scheduling module after the first task finishes executing. The scheduling module may then select another task for execution.

In some embodiments, the scheduling module may request additional priority information about the first task. For example, if the initial priority information sent from the virtual machine only contained an identifier of the task and a description of the task, and if the scheduling module needs to know a category of the task to schedule the task, the scheduling module may request that the virtual machine send category information about the first task. An agent on the virtual machine may send the first task's category information to the scheduling module. The scheduling module may then use the category of the task in determining the priority of the task.

The scheduling module may also send a virtual machine scheduling information about a task. For example, the scheduling module may send the virtual machine the priority determined for the task, a status of a resource needed to execute the task, and/or information about one or more other tasks. The virtual machine may use the scheduling information to make a better decision about when to execute the task.

As part of scheduling a task, a scheduling module may determine the current availability of a resource (e.g., a hard drive, a network resource, a CPU, or any other resource) needed to execute the first task. The scheduling module may also track use of a resource and/or predict future availability of a resource in determining when to schedule a task. When scheduling a task, the scheduling module may also identify one or more performance metrics of a resource needed to execute the first task. A performance metric may be a property of a resource that may affect the resource's ability to perform a task.

According to various embodiments, determining a priority of a task may comprise determining a security threat level. For example, the scheduling module may determine a THREATCON security threat level. If the THREATCON level is high, the scheduling module may give higher priority to security-related tasks.

Embodiments of the present disclosure may provide various advantages over prior technologies. For example, methods described herein may allow a hypervisor to communicate with virtual machines to help schedule more important tasks to execute before less important tasks. Embodiments of the instant disclosure provide for more efficient scheduling and for the cooperation of operating systems running in virtual machines to distribute loads on resources of a host machine.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
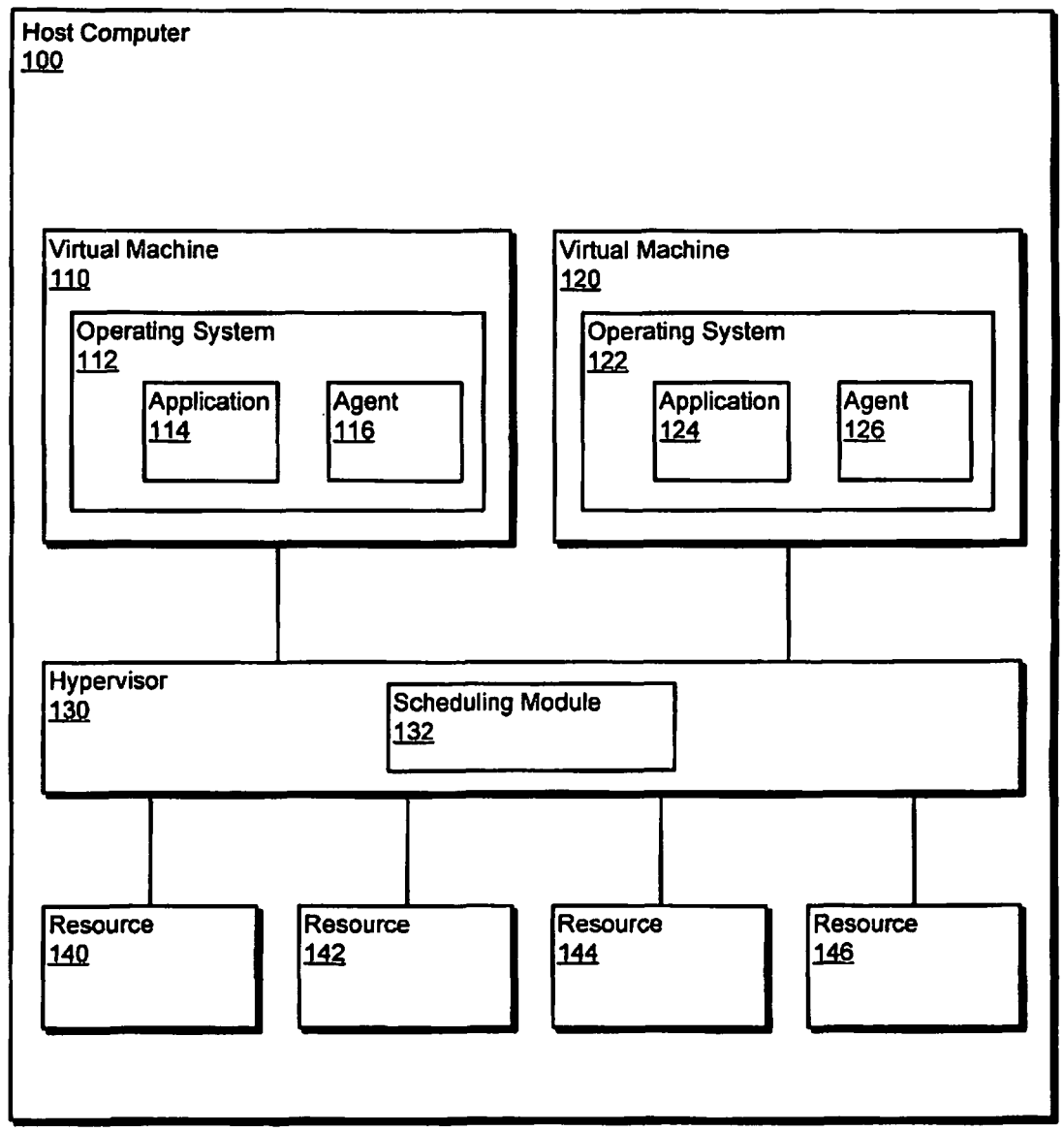
FIG. 1 is a block diagram of an exemplary host computer according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Figure 2:
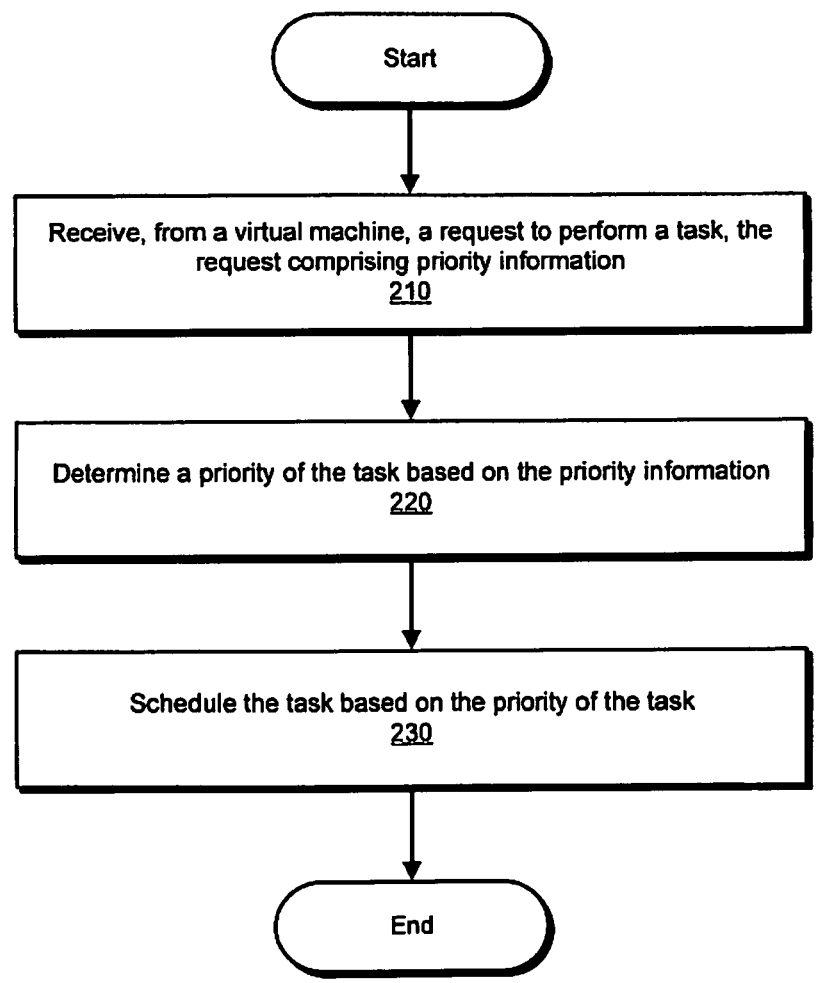
FIG. 2 is a flow diagram of an exemplary computer-implemented method for prioritizing tasks from virtual machines according to certain embodiments.
Figure 3:
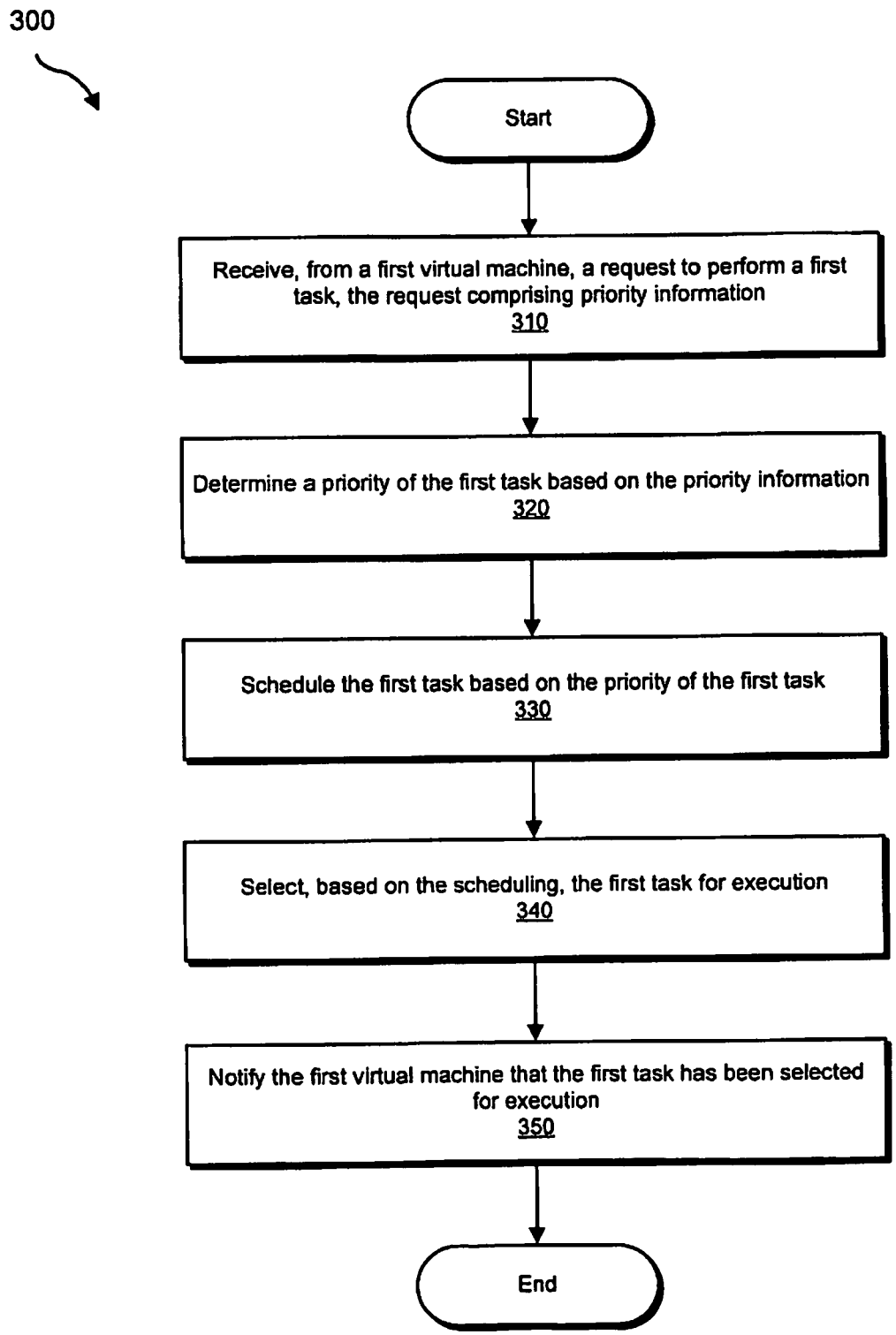
FIG. 3 is a flow diagram of another computer-implemented method for prioritizing tasks from virtual machines according to certain embodiments.
Figure 4:
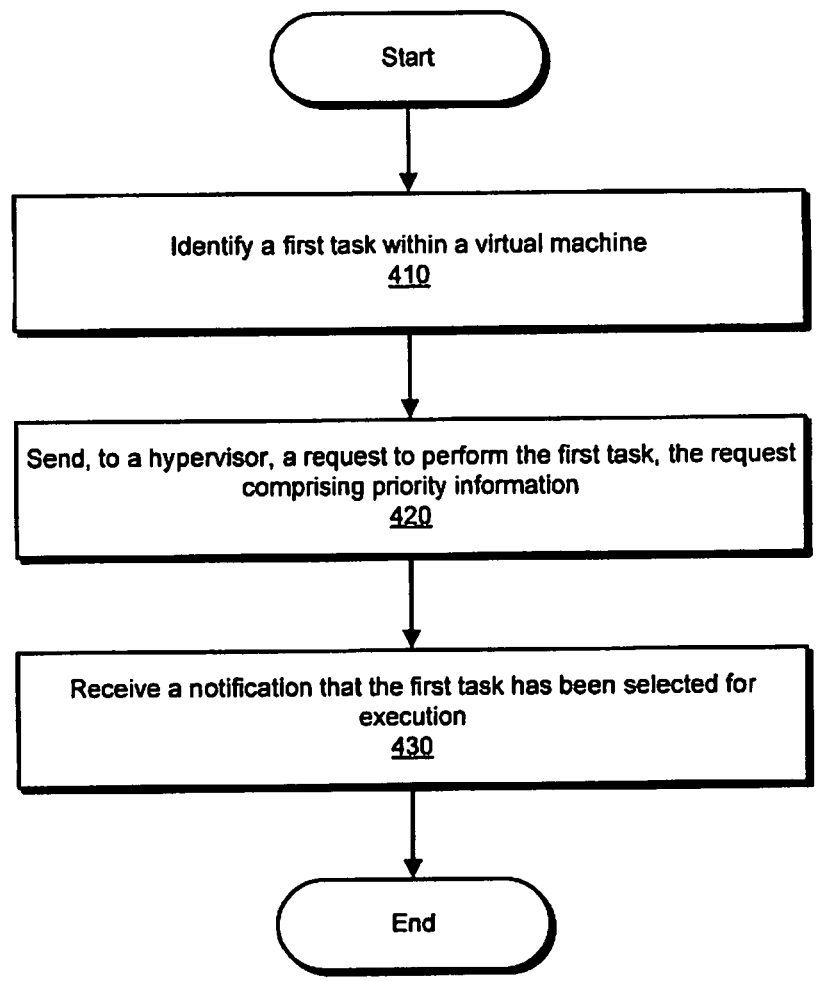
FIG. 4 is an exemplary flow diagram of a method for prioritizing virtual machine tasks and includes steps that may be performed by a virtual machine.
Figure 5:
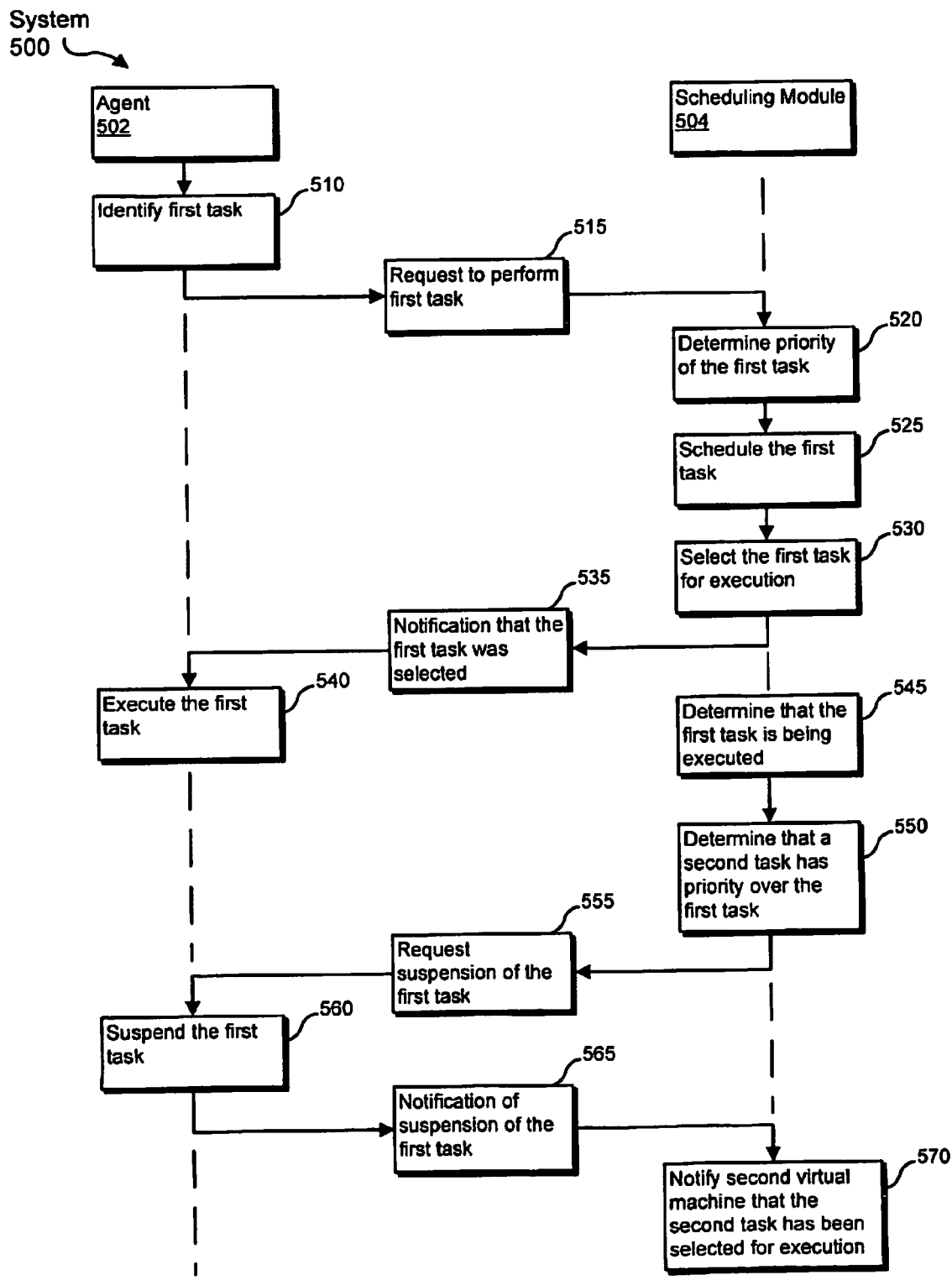
FIG. 5 is a block diagram of an exemplary system for prioritizing tasks and shows communications between an agent on a virtual machine and a scheduling module on a hypervisor.
Figure 6:
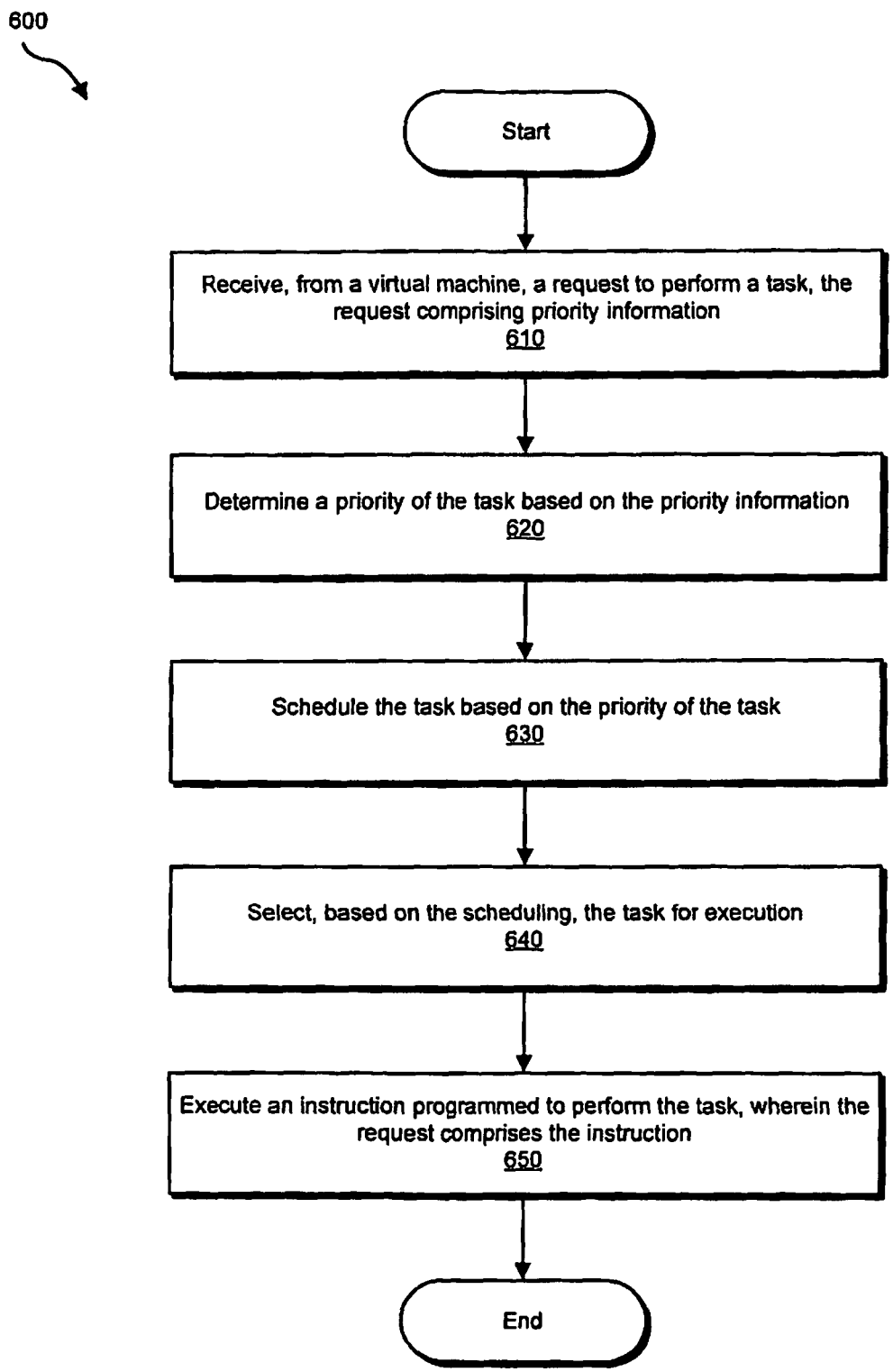
FIG. 6 is an exemplary flow diagram of a method for prioritizing tasks from virtual machines according to certain embodiments.

Embodiments of the present disclosure provide various methods and systems for prioritizing tasks from virtual machines. As previously mentioned, a scheduling module on a hypervisor may receive a request to perform a task and may schedule the task based on a variety of different types of scheduling information. FIG. 1 shows a host computer with virtual machines that may communicate with a hypervisor to perform various functions described here. FIGS. 2, 3, and 6 show steps that may be performed by the hypervisor or by a scheduling module on the hypervisor. FIG. 4 shows steps that may be performed by a virtual machine or by an agent running on the virtual machine. FIG. 5 is a diagram of a system that shows steps performed by both an agent on a virtual machine and a scheduling module on a hypervisor.

FIG. 1 shows a host computer 100. Host computer 100 may be any suitable computing device. For example, host computer 100 may be computing device 710 shown in FIG. 7, and/or may be implemented by any of the network devices shown in FIG. 8. Host computer 100 may include multiple virtual machines, such as a virtual machine 110 and a virtual machine 120. Virtual machines 110 and 120 may be managed by a hypervisor 130. Hypervisor 130 may manage virtual machine access to resources of host computer 100. These resources may include a resource 140, a resource 142, a resource 144, and a resource 146. In one example, resource 140 may be a storage device, resource 142 may be a CPU, resource 144 may be a network interface card, and resource 146 may be Random Access Memory (RAM).

Hypervisor 130 may include a scheduling module 132. Scheduling module 132 may be any module, application, or other computer-executable code capable of performing one or more of the steps disclosed herein. In some embodiments, scheduling module 132 may be code integrated in hypervisor 130. In other embodiments, scheduling module 132 may be an add-on for hypervisor 130, a plug-in for hypervisor 130, or a separate module or application that facilitates communication between virtual machines 110, 120 and hypervisor 130.

Scheduling module 132 may receive task requests from virtual machine 110 and/or virtual machine 120. For example, virtual machine 110 may include an agent 116 running on an operating system 112 of virtual machine 110. When an application, such as application 114, attempts to execute a task, agent 116 may send a request to scheduling module 132 before the task is sent to hypervisor 130 for execution. The request to perform the task may comprise priority information associated with the task.

The priority information may be any information associated with the task that may help scheduling module 132 determine how to prioritize execution of the task. For example, priority information may be an identifier of the first task, a description of the first task, a category of the first task, a priority of the first task, an identifier of a resource needed to execute the first task, an owner of the first task, and/or an amount of time that the first task has been pending in virtual machine 110. Priority information may also comprise any other information that may help scheduling module 132 determine the scheduling priority of a task.

After receiving the request, scheduling module 132 may determine a priority of the first task. Scheduling module 132 may use the priority information sent with the first task to determine the priority of the first task. After determining the priority of the task, the scheduling module may schedule the first task. For example, scheduling module 132 may place the first task in a queue of tasks for a resource needed by the first task.

After the first task has been queued or otherwise scheduled, scheduling module 132 may notifying virtual machine 110 when it is the first task's turn to execute. For example, scheduling module 132 may select the first task for execution and may send virtual machine 110 a notification that the first task has been selected for execution. Scheduling module 132 may also manage tasks sent from virtual machine 120 in a similar manner. While only two virtual machines are shown in FIG. 1, scheduling module 132 may receive requests to perform tasks from any number of virtual machines.

As an example of the process of requesting access to a resource, application 124, which is running on operating system 122 of virtual machine 120, may request to read data from resource 144. Resource 144 may be a hard disk of host computer 100. In some embodiments, application 124 may be a good citizen and may call a scheduling interface that communicates with agent 126. The scheduling interface of application 124 may ask agent 126 to send a request to scheduling module 132 to perform the task of reading data from resource 144. In some embodiments, the scheduling interface may include the functionality of agent 126 and may communicate directly with scheduling module 132.

In other embodiments, agent 126 may monitor instructions sent from application 124 and may intercept these instructions (e.g., tasks) and send requests for performing the instructions to scheduling module 132. For example, agent 126 may hook a process of operating system 122 to intercept instructions at the operating system level. Thus, when application 124 attempts to access memory on resource 144, before the attempt to access memory is sent to hypervisor 130, agent 126 may intercept the attempt to perform the memory access and may send a request to scheduling module 132. The request sent to scheduling module 132 may include priority information for the memory access that application 124 is attempting to perform.

Once scheduling module 132 receives the request to read data on resource 144, scheduling module 132 may determine a priority of the request. In one example, the request may be from application 124, which may be a security application requesting to perform a routine but resource-intensive file system scan. Scheduling module 132 may also receive a separate request from application 114 on virtual machine 110. Application 114 may be a video editing program requesting to access the same memory resource that application 124 needs to access. Scheduling module 132 may have a prioritization rule that gives priority to the request from the video editing program. Thus, scheduling module 132 may schedule the task from application 124 to execute after the task requested by application 114. When scheduling module 132 determines that the task requested by application 114 is complete (e.g., when agent 116 notifies scheduling module 132 that the task is complete), scheduling module 132 may notify agent 126 that the task requested by application 114 may be executed.

Operating systems, such as operating system 112 and operating system 122, may include internal schedulers. These schedulers may attempt to balance resource use of tasks within the operating systems. However, the schedulers are not aware of tasks being requested by other virtual machines. In some embodiments, the agents on virtual machines 110 and 120 may intercept requests to perform tasks by intercepting requests from the operating system schedulers. In other embodiments, the agents may identify these attempts to access resources by monitoring the operating system schedulers. In at least one embodiment, an operating system scheduler may coordinate with an agent to manage task requests. The functionality of the operating system and the agent may be combined in a single application or module.

When scheduling a task, scheduling module 132 may determine the current availability of a resource needed to execute a task. Scheduling module 132 may also track the use of a resource. As an example, scheduling module 132 may track virtual machine 110's use of resource 144 so that scheduling module 132 may be able to determine when resource 144 is available for use by virtual machine 120. In some embodiments, scheduling module 132 may predict future availability of a resource. Scheduling module 132 may predict future availability of a resource based on prior usage patterns and trends, system notifications, or any other algorithms or heuristics that may be used to predict when the resource may become available. Scheduling module 132 may use future availability information of a resource to determine where to schedule a task in an execution queue.

FIG. 2 shows steps that may be performed by a scheduling module, such as scheduling module 132. The scheduling module may receive a request to perform a task (step 210). The request may be received from a first virtual machine and may comprise priority information. A request to perform a task may be any query or request about whether and/or when a virtual machine or an application on a virtual machine may use a resource of a host computer to perform a task. A task may be any job, process, or other computer-executable instruction sent from an application or an operating system. For example, a task may be a request to access a file in a file system, a request to use a CPU to process a rendering job, a request to use a network interface card to access the internet, or any other function that may utilize hardware or software resources on a computing device.

The request may comprise priority information. As previously noted, the priority information may include various types of data that describe a task. For example, the priority information may comprise an identifier of the task. The identifier of the task may be any designation used to distinguish the task from other tasks. The priority information may also include a description of the task. The description of the task may be a plain-language description of the function that the task is intended to perform. The description may also be code that is readable by a hypervisor scheduling module. The priority information may include a category of the task. The category of the task may distinguish the task from other types of tasks. For example, the category may be a memory-access category, a network-access category, a CPU-intensive-task category, or any other property that may be used to classify tasks. The priority information may also comprise a priority of the task. For example, the agent that sends the priority information may indicate that the priority of the task should be high. The priority of a task may indicate the relative importance of the task to another task or another set of tasks.

The priority information may also include an identifier of a resource needed to execute a task. For example, if a task needs to access a file system, the identifier may identify the file system. In other examples, priority information may indicate that a task needs to use a CPU resource, a network access resource, or any other resource. In some embodiments, priority information may indicate that a task needs multiple resources. An identifier may be any code or other indicator that uniquely identifies a resource or a set of resources.

In some embodiments, the priority information may include information about an owner of the task. The owner of the task may be an application that requested execution of the task. The owner of the task may also be an operating system that requested performance of the task, the agent that is requesting performance of the task, a user logged in to a virtual machine that is requesting performance of the task, or any other entity that may be designated as a task owner.

In various embodiments, the priority information may indicate an amount of time that the first task has already been pending at an operating system level. For example, an operating system scheduler may have scheduled the task as a low priority task. Before the operating system even attempts to send the task to the hypervisor, a significant amount of time may have passed. In such situations, an agent that intercepts an attempt to access the task from the operating system may indicate to the scheduling module that the task has already been pending at the operating system level for a long time and may request higher priority based on this information. In other embodiments, the scheduling module may use the amount of time the task has been pending to decide whether the task should be given higher priority.

After receiving a request to perform a task, the scheduling module may determine a priority of the task based on the priority information included in the request (step 220). The scheduling module may use a set of prioritization rules to determine the priority of the task. These prioritization rules may be similar to prioritization rules used by operating system schedulers. For example, these rules may indicate that tasks from certain applications or processes should be granted higher priority than tasks from other applications or processes.

The scheduling module may use any of the previously mentioned priority information to determine a priority of a task. For example, the scheduling module may use task owner information, task resource information, task description information, task category information, or any other priority information to determine a priority of the task.

A priority of a task may be a representation of the task's importance relative to other tasks. For example, a priority may be a designation on a scale from 1 to 10, a designation of "high priority", "medium priority", or "low priority", or any other metric that may be used to designate a task's priority. A task's priority may also be any other information that a scheduler may use to determine when to schedule a task. For example, a priority of a task may indicate that a task should be scheduled immediately.

The scheduling module may also use a variety of other priority information to determine how the task should be scheduled. For example, the scheduling module may identify a resource needed to execute the task. If a task is a CPU-intensive task and the CPU is currently being used by another CPU-intensive task, the scheduling module may determine that the task should be scheduled to operate after the currently executing task finishes. The scheduling module may also determine availability of any other types of resources, including network resources, CPU resources, storage resources, input/output resources, or any other computer hardware, firmware, or software resources.

In various embodiments, a scheduling module may track the use of a resource and use the tracking information to determine when the task should be scheduled. For example, the scheduling module may monitor CPU usage, network bandwidth, or any other resource usage. Similarly, the scheduling module may predict availability of the resource in the future to determine when the task should be scheduled. For example, the scheduling module may determine that a network resource needed to execute the task may not be available for another five minutes. The scheduling module may schedule the resource for execution in five minutes based on this information.

The scheduling module may also identify performance metrics of a resource needed to execute the first task when scheduling the first task. For example, the scheduling module may determine that a network interface card has a bandwidth of 10 megabits per second. If the task requires heavy use of network bandwidth, the scheduling module may look for a time when the full 10 megabits per second of bandwidth may become available to allow the task to execute. Other examples of performance metrics may be read and write times of storage devices, clock frequencies of processing devices, network latency, response times of input and output devices, and any other metrics that define inherent performance characteristics of resources.

In some embodiments, a scheduling module may use a security threat level in determining the priority of a task. The security threat level may be any indication of a security threat or other security issues relevant to a computing device, a set of computing devices, or a network. An example of a security threat level is a THREATCON level. The scheduling module may use the security threat level as one factor among many in determining how to schedule a task. In other embodiments, the security threat level may be the only factor used in determining how to schedule a task. For example, if a security threat level is very high, all security related tasks may be given high priority and may be put in the front of an execution queue.

In some embodiments, the scheduling module may request additional priority information about the first task. For example, if the initial priority information sent from the virtual machine only contained an identifier of the task and a description of the task, and if the scheduling module needs to know a category of the task to schedule the task, the scheduling module may request that the virtual machine send category information about the first task. An agent on the virtual machine may send the first task's category information to the scheduling module. The scheduling module may then use the category of the task in determining the priority of the task.

After determining a priority of the task, the scheduling module may schedule the task based on the priority of the task (step 230). The scheduling module may schedule the task by placing the task in an execution queue. The execution queue may be an execution queue for a particular resource or set of resources. In other embodiments, the execution queue may be a global execution queue for each task being performed on a computing device. In some embodiments, the scheduling module may schedule the task by deciding that the task may be performed immediately. The scheduling module may also schedule the task by assigning a later point in time for the task to execute.

A scheduling module may schedule a task based on the priority of the task by using the priority to determine where a task should be placed in a queue of tasks. For example, a queue of tasks may already have three pending tasks—two with high priority and one with low priority. The two tasks with high priority may be scheduled to execute before the task with low priority. If the scheduling module determines that a new task has a medium priority, the scheduling module may schedule the new task to execute after the two high-priority tasks but before the low-priority task.

In some embodiments, scheduling a task may also comprise reevaluating priorities of one or more other tasks in a queue to determine where the task should be scheduled. According to some embodiments, in the scheduling process the scheduling module may evaluate resource performance metrics, resource availability, and/or various other parameters to determine how the task should be scheduled.

The process illustrated in FIG. 2 may be implemented in a variety of ways. In some embodiments, a task request may be sent from an agent on a virtual machine, and the agent may wait for a response to the request before allowing the task to execute. FIGS. 3, 4, and 5 provide examples of such embodiments. In other embodiments, a request may include one or more instructions required to perform the task, and a scheduling module on a virtual machine may allow a task to execute without responding to the agent or virtual machine that made the request. Examples of such embodiments are discussed in greater detail in the description corresponding to FIG. 6.

FIG. 3 is a flow diagram of various steps that may be performed by a scheduling module in communication with an agent on a virtual machine. For example, the scheduling module may receive a request to perform a first task (step 310). The scheduling module may determine a priority of the first task (step 320). Then, as previously discussed, the scheduling module may schedule the first task (step 330).

The scheduling module may select, based on the scheduling, the first task for execution (step 340). For example, the scheduling module may select the first task when the first task reaches the front of a scheduling queue. In other embodiments, the scheduling module may select the first task for execution when a predetermined time for executing the task arrives. The scheduling module may also select the first task for execution based on any other algorithm or heuristic for deciding that the first task should be executed.

After selecting the first task for execution, the scheduling module may then notify the first virtual machine (step 350) of the selection of the first task. The scheduling module may notify the first virtual machine that the task has been selected for execution by sending a notification to an agent of the virtual machine. The notification may include an identifier of the task so that the agent knows which task has been selected for execution and may proceed to execute the task. In some embodiments, the notification may include a description of the task or any other task identification information that the agent may be able to use to identify the task.

FIG. 4 illustrates steps that may be performed by an agent on a virtual machine. The agent may be any module, application, set of modules, set of applications, or other computer-executable code programmed to perform one or more of the steps disclosed herein. The agent may identify a first task within a virtual machine (step 410). In some embodiments, the agent may identify the first task by receiving a request to perform the first task from a scheduling interface of an application. In such embodiments, the application may initiate a request to perform a task before actually attempting to perform the task. In other embodiments, the agent may identify the task by identifying a task scheduled by an operating system of the virtual machine. In some embodiments, the agent may identify the task by hooking an operating system function and intercepting a request to perform a task.

After identifying the first task, the agent may send a request to perform the first task to a hypervisor (step 420). The request may comprise priority information. The agent may send the request to a hypervisor by sending the request to a scheduling module within or otherwise associated with a hypervisor. The virtual machine on which the agent resides may wait to attempt to execute the task until receiving permission or notification from a scheduling agent on the hypervisor that the task may be executed.

The agent may receive a notification that the first task has been selected for execution (step 430) and then may allow the first task to execute. In some embodiments, the agent may allow the first task to execute by notifying an application that the application may proceed with executing the task. In other embodiments, the agent may allow an operating system to send the task to a hypervisor for execution. In some embodiments, the agent itself may forward the task to the hypervisor for execution.

In some embodiments, the agent may receive scheduling information from the hypervisor. The scheduling information may be scheduling information associated with the task. For example, the hypervisor may send the agent scheduling information that tells the agent how long it may be before the task may be allowed to execute. In some embodiments, the scheduling information may also be information about the usage of a resource needed to perform the task, information about other tasks requested by other virtual machines, or any other information that the scheduling module on the hypervisor may use in determining how to schedule the task. The agent may use the scheduling information to determine when to execute the first task. In other words, the agent may also play a role in determining when to execute a task by intelligently using scheduling information received from the hypervisor. The scheduling information may help the agent be aware of system resource use or other system information that the agent would not otherwise be able to access.

FIG. 5 shows an exemplary system 500 with communications between an agent 502 and a scheduling module 504. Agent 502 may be an agent running on or on behalf of a first virtual machine. Scheduling module 504 may be a module running and/or in communication with a hypervisor. As shown, agent 502 may identify a first task (step 510). Agent 502 may send a request to perform the first task (step 515) to scheduling module 504. After receiving the request, scheduling module 504 may determine a priority of the task (step 520). Then, scheduling module 504 may schedule the first task (step 525). Once it is the task's turn to execute, scheduling module 504 may select the first task for execution (step 530). Then, scheduling module 504 may notify agent 502 that the first task was selected (step 535). Agent 502 may then execute the first task (step 540).

At a later point in time, security module 504 may determine that the first task is being executed (step 545). Security module 504 may also determine that a second task requested by a second virtual machine has priority over the first task (step 550). In some embodiments, step 550 may be performed before step 545. For example, security module 504 may receive a request to perform the second task, determine that the second task has priority over the first task, and then determine that the first task is being executed.

Scheduling module 504 may determine that the second task may need to execute as soon as possible and may request suspension of the first task (step 555). Agent 502 may receive the request for suspension of the first task and may determine whether the first task can be suspended. Agent 502 may determine whether the task can be suspended by querying the application or operating system that is requesting execution of the task. If the task can be suspended, the operating system, the application, or even agent 502 may suspend the first task (step 560). Then, agent 502 may send a notification of suspension of the first task to scheduling module 504 (step 565). Scheduling module 504 may then notify the second virtual machine that the second task has been selected for execution (step 570), and the second virtual machine may execute the second task. After the second task finishes executing, scheduling module 504 may notify agent 502 that execution of the first task may be resumed.

FIG. 6 shows a computer-implemented method for prioritizing tasks from virtual machines. The steps shown in FIG. 6 may be performed by a scheduling module on a hypervisor. The scheduling module may receive a request to perform a task from a virtual machine (step 610). The request may comprise priority information, and the scheduling module may use the priority information to determine a priority of the task (step 620). The scheduling module may schedule the task based on the priority of the task (step 630).

The request to perform the task may be sent with an instruction for executing the task. In some embodiments, an agent in the virtual machine may create the request by including the priority information an instruction sent from an application or operating system. For example, the agent may attach the priority information to the instruction as metadata. In such embodiments, the scheduling module may not need to communicate back to the agent before the task is performed. For example, the scheduling module may select the task for execution (step 640). Then, the scheduling module may execute the instruction sent with the task, thereby executing the task (step 650).

Figure 7:
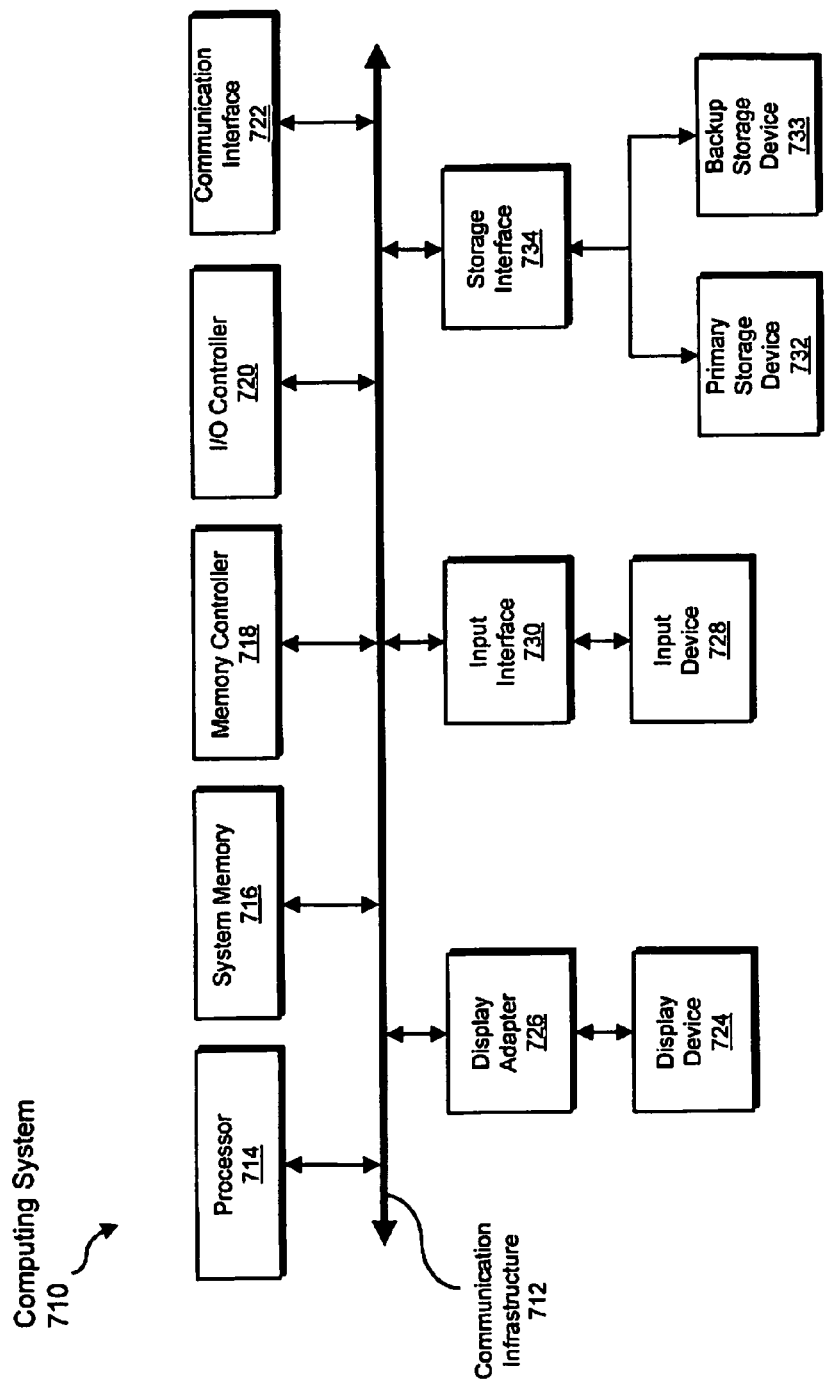
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, determining, scheduling, selecting, notifying, requesting, sending, tracking, predicting, using, executing, and/or creating steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments, memory controller 718 may control communication between processor 714, system memory 716, and I/O controller 720 via communication infrastructure 712. In certain embodiments, memory controller 718 may perform and/or is a means for performing, either alone or in combination with other elements, one or more of the steps or features described and/or illustrated herein, such as receiving, determining, scheduling, selecting, notifying, requesting, sending, tracking, predicting, using, executing, and/or creating.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for receiving, determining, scheduling, selecting, notifying, requesting, sending, tracking, predicting, using, executing, and/or creating steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments, communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, determining, scheduling, selecting, notifying, requesting, sending, tracking, predicting, using, executing, and/or creating steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, determining, scheduling, selecting, notifying, requesting, sending, tracking, predicting, using, executing, and/or creating steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the identifying, receiving, determining, scheduling, selecting, notifying, requesting, sending, tracking, predicting, using, executing, and/or creating steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
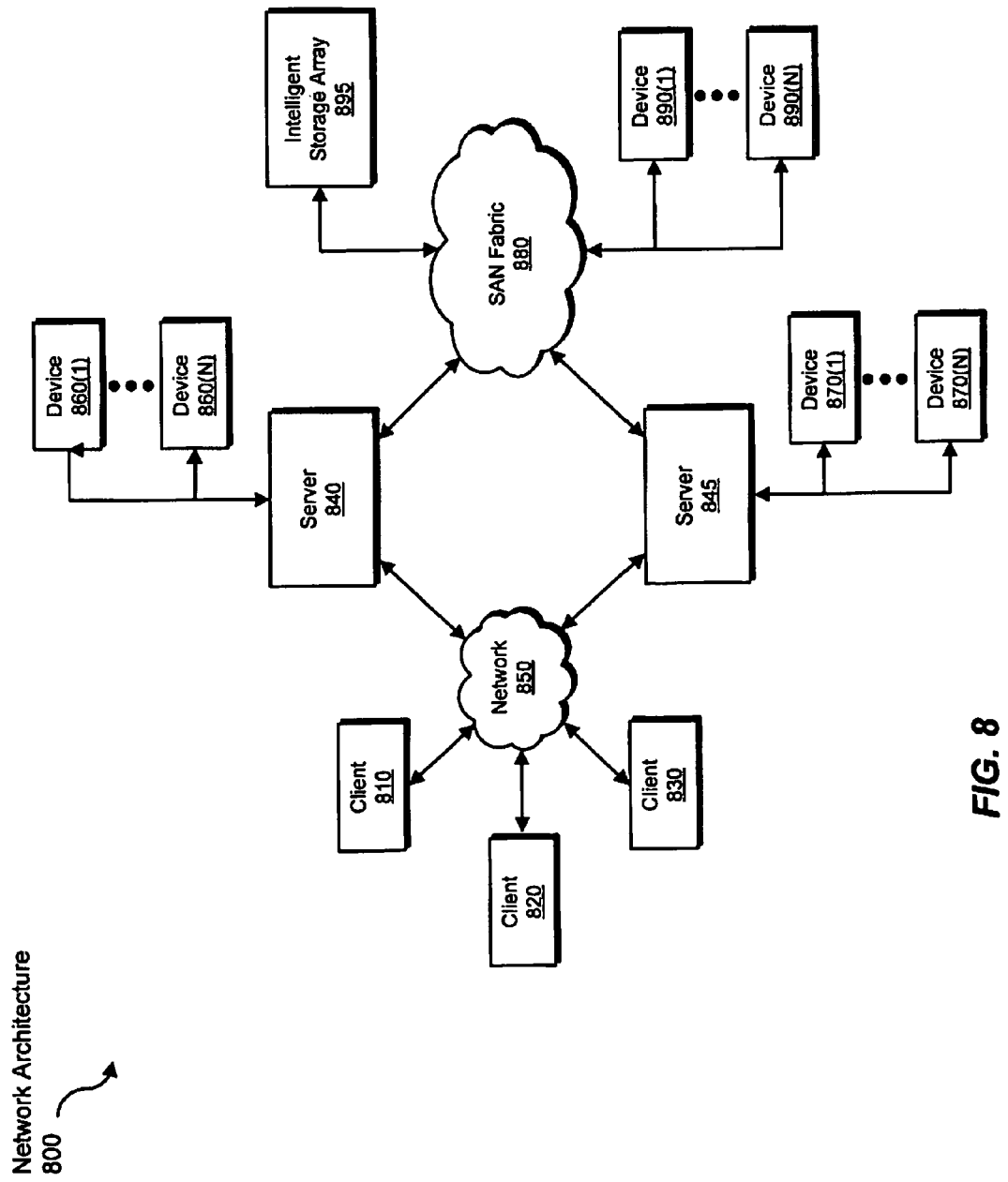
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between Servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the internet) for exchanging data, the embodiments described and/or illustrated herein are not limited to the internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, determining, scheduling, selecting, notifying, requesting, sending, tracking, predicting, using, executing, and/or creating steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, a scheduling module in a hypervisor may receive a request to perform a first task. The request may come from a first virtual machine. The request may include priority information. The scheduling module may then determine a priority of the first task based on the priority information and may schedule the first task based on the priority information. The scheduling module may subsequently select the first task for execution based on the scheduling. Once the scheduling module has selected the first task for execution, it may notify the first virtual machine of the selection.

In certain embodiments, the scheduling module may determine that the first task is being executed and that a second task from a second virtual machine has priority over the first task. The scheduling module may then request that the first virtual machine suspend the first task. In response to that request, the scheduling module may receive notification of suspension of the first task. The scheduling module may subsequently notify the second virtual machine that the second task has been selected for execution. In a further embodiment, the scheduling module may request additional priority information about the first task.

In at least one embodiment, the computer-implemented method for prioritizing tasks from virtual machines may further include the scheduling module sending the first virtual machine scheduling information for the first task. In a further embodiment, the scheduling information may include the priority of the first task, a status of a resource needed to execute the first task, or information about a second virtual machine's request to perform a second task.

According to some embodiments, the computer-implemented method for prioritizing tasks from virtual machines may further comprise the scheduling module receiving notification that the first task has been completed. In certain embodiments, the priority information may include an identifier of the first task, a description of the first task, a category of the first task, the priority of the first task, an identifier of a resource needed to execute the first task, an owner of the first task, or an amount of time that the first task has been pending. In some embodiments, scheduling the first task may include the scheduling module determining current availability of a resource needed to execute the first task, tracking use of the resource, or predicting future availability of the resource.

As defined in some embodiments, the computer-implemented method for prioritizing tasks from virtual machines may further comprise the scheduling module identifying a performance metric of a resource needed to execute the first task. In certain embodiments, determining the priority of the first task may include determining a security threat level and determining whether the first task is security related.

In several embodiments, the computer-implemented method for prioritizing tasks from virtual machines may comprise an agent within a virtual machine identifying a first task within the virtual machine. The agent may then send, to a hypervisor, a request to perform the first task. This request may include priority information. In response to this request, the agent may receive a notification that the first task has been selected for execution.

In various embodiments, the computer-implemented method for prioritizing tasks from virtual machines may further comprise the agent receiving a request to perform the first task from a scheduling interface of an application. In some embodiments, the first task may be a task scheduled by an operating system.

As captured by certain embodiments, the computer-implemented method for prioritizing tasks from virtual machines may further comprise the agent receiving scheduling information from the hypervisor. The agent may then use the scheduling information to determine when to execute the first task. In some embodiments, the method may further comprise receiving a request from the hypervisor to suspend the first task. The agent may then decide to suspend the first task, after which it may send the hypervisor a notification of the suspension.

In some embodiments, the computer-implemented method for prioritizing tasks from virtual machines may comprise the scheduling module receiving a request from a virtual machine to perform a task. The request may include priority information. The scheduling module may then determine a priority of the task based on the priority information. Based on this priority, the scheduling module may then schedule the task.

In particular embodiments, the computer-implemented method for prioritizing tasks from virtual machines may further comprise the scheduling module selecting the task for execution based on the scheduling. The scheduling module may then execute an instruction programmed to perform the task. The request may have included the instruction. In further embodiments, the agent may create the request by including the priority information with the instruction. In further embodiments, the scheduling module may select the task for execution based on the scheduling. The scheduling module may then notify the virtual machine that the task has been selected for execution. In a further embodiment, the agent may receive notification that the first task has been completed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for prioritizing tasks from virtual machines, the computer-implemented method comprising:
   receiving, from a task scheduling agent within a first virtual machine, a request to perform a first task of an application, wherein:
      the request comprises priority information,
      the request is received at a scheduling module of a hypervisor that manages the first virtual machine,
      the priority information comprises an identifier of a resource needed to execute the first task,
      and the task scheduling agent sends the request to the scheduling module before the first task is sent to the hypervisor for execution;
   determining a priority of the first task based on the priority information by predicting future availability of the resource, wherein predicting the future availability of the resource comprises tracking use of the resource to identify a performance metric of the resource;
   scheduling the first task based on the priority of the first task by evaluating the performance metric of the resource;
   selecting, based on the scheduling, the first task for execution;
   notifying the task scheduling agent within the first virtual machine that the first task has been selected for execution.

2. The computer-implemented method of claim 1, further comprising:
   determining that the first task is being executed;
   determining that a second task from a second virtual machine has priority over the first task;
   querying the task scheduling agent within the first virtual machine to determine whether the first task can be suspended;
   determining, based on the response from the task scheduling agent within the first virtual machine, that the first task can be suspended;
   requesting that the first virtual machine suspend the first task;
   receiving, from the task scheduling agent, notification of suspension of the first task;
   notifying the second virtual machine that the second task has been selected for execution.

3. The computer-implemented method of claim 1, further comprising:
   requesting additional priority information about the first task;
   receiving, from the task scheduling agent, information indicating a resource-access category of the first task, wherein the resource-access category of the first task distinguishes the first task from other categories of tasks based on one or more types of resources that are required to perform the first task.

4. The computer-implemented method of claim 1, wherein:
   the task scheduling agent is programmed to wait for a response from the scheduling module before allowing the application to execute the first task;
   the task scheduling agent is programmed to allow the first task to be sent to the hypervisor for execution after being notified that the first task has been selected for execution.

5. The computer-implemented method of claim 1, wherein the task scheduling agent is programmed to identify the first task by monitoring an operating system scheduler of an operating system of the first virtual machine.

6. The computer-implemented method of claim 1, wherein:
   the resource comprises a storage device;
   the performance metric of the resource comprises a read time for the storage device and/or a write time for the storage device.

7. The computer-implemented method of claim 1, wherein:
   the resource comprises a network interface;
   the performance metric of the resource comprises a bandwidth of the network interface.

8. The computer-implemented method of claim 1, wherein predicting the future availability of the resource is based on prior usage patterns of the resource.

9. The computer-implemented method of claim 1, wherein scheduling the first task comprises:
   reevaluating priorities of one or more other tasks in a task queue to determine where the first task should be scheduled in the task queue.

10. The computer-implemented method of claim 1, wherein determining the priority of the first task further comprises:
    determining that a security threat level is high;
    determining, based on the priority information, that the first task is security related;
    scheduling the first task comprises giving the first task priority over one or more other tasks based on the security threat level being high and the first task being security related.

11. A computer-implemented method for prioritizing virtual machine tasks, the computer-implemented method comprising:
    identifying a first task within a virtual machine that is managed by a hypervisor, the identifying being performed by a task scheduling agent within the virtual machine;
    sending, from the task scheduling agent to the hypervisor, a request to perform the first task, wherein the request comprises priority information and the request is sent by the task scheduling agent before the first task is sent to the hypervisor for execution;

determining, at a scheduling module in the hypervisor, that a security threat level is high, wherein the security threat level indicates a security threat relevant to a computing system that comprises the hypervisor and the virtual machine;

determining, at the scheduling module and based on the priority information, that the first task is security related;

scheduling, at the scheduling module, the first task comprises giving the first task priority over one or more other tasks based on the security threat level being high and the first task being security related;

receiving, at the task scheduling agent, a notification that the first task has been selected for execution.

12. The computer-implemented method of claim 11, wherein identifying the first task comprises:

hooking a process of an operating system of the virtual machine to intercept a request from an application to perform the first task.

13. The computer-implemented method of claim 11, wherein:

receiving the notification comprises receiving scheduling information about the first task from the scheduling module;

the computer-implemented method further comprises using, at the task scheduling agent, the scheduling information to determine when to allow the first task to be sent from the virtual machine to the hypervisor for execution.

14. The computer-implemented method of claim 11, further comprising:

waiting for the notification before allowing an application to execute the first task;

allowing the first task to be sent to the hypervisor for execution after being notified that the first task has been selected for execution, wherein the waiting and allowing are performed by the task scheduling agent.

15. The computer-implemented method of claim 11, further comprising:

sending, with the request to perform the first task, an instruction for executing the first task such that the first task may be executed before responding to the request from the task scheduling agent.

16. A computer-implemented method for prioritizing tasks from virtual machines, the computer-implemented method comprising:

receiving, from a task scheduling agent within a virtual machine, a request to perform a task, wherein the request comprises priority information, the request is received at a scheduling module of a hypervisor that manages the virtual machine, the priority information comprises an identifier of a resource needed to execute the task, and the task scheduling agent sends the request to the scheduling module before the task is sent to the hypervisor for execution;

determining a priority of the task based on the priority information by predicting future availability of the resource, wherein predicting the future availability of the resource comprises tracking use of the resource to identify a performance metric of the resource;

scheduling the task based on the priority of the task by evaluating the performance metric of the resource.

17. The computer-implemented method of claim 16, further comprising:

selecting, based on the scheduling, the task for execution;

executing an instruction programmed to perform the task, wherein the request comprises the instruction.

18. The computer-implemented method of claim 17, further comprising:

creating the request by including the priority information with the instruction.

19. The computer-implemented method of claim 16, further comprising:

sending scheduling information associated with scheduling the task to the task scheduling agent, wherein the scheduling information provides the task scheduling agent with system resource use information and the task scheduling agent uses the system resource use information to determine when to send the task to the hypervisor for execution.

20. The computer-implemented method of claim 16, wherein:

the identifier of the resource indicates that the task needs to use at least one of:
a CPU resource,
a network resource;

determining the priority of the task comprises determining availability of the at least one of:
the CPU resource,
the network resource.

* * * * *